United States Patent [19]

Hunter et al.

[11] Patent Number: 5,413,834
[45] Date of Patent: May 9, 1995

[54] MITER-FOLDABLE SATURATED PAPER-BASED OVERLAY SYSTEM AND METHOD FOR FABRICATING THE SAME

[75] Inventors: Bruce W. Hunter, Pennsburg; Harold C. Hieter, Quakertown, both of Pa.

[73] Assignee: Specialty Paperboard/Endura, Inc., Brattleboro, Vt.

[21] Appl. No.: 862,017

[22] Filed: Mar. 31, 1992

[51] Int. Cl.⁶ .............................. B32B 3/04
[52] U.S. Cl. ......................... 428/121; 428/153; 428/163; 428/165; 428/187; 428/195; 428/425.1; 428/537.1; 525/227; 525/239
[58] Field of Search ............... 428/121, 153, 161, 163, 428/165, 187, 535, 537.1, 537.5, 167, 195, 211, 201, 203, 425.1; 427/361, 391; 156/307.3, 307.5, 312; 525/227, 221, 239

[56] References Cited

U.S. PATENT DOCUMENTS

| | | | |
|---|---|---|---|
| 2,943,952 | 7/1960 | Clark | 117/36 |
| 2,975,147 | 3/1961 | Abbott et al. | 260/7.5 |
| 3,014,004 | 12/1961 | Meler | 260/29.6 |
| 3,037,952 | 6/1962 | Jordan et al. | 260/29.6 |
| 3,066,109 | 11/1962 | Hechtmann et al. | 260/29.6 |
| 3,068,118 | 12/1962 | Biskup et al. | 117/76 |
| 3,206,427 | 9/1965 | Butzler et al. | 260/31.8 |
| 3,303,046 | 2/1967 | Chebiniak et al. | 117/36.1 |
| 3,455,726 | 7/1969 | Mitchell et al. | 117/76 |
| 3,813,262 | 5/1974 | Shelton | 428/153 |
| 4,010,307 | 3/1977 | Canard et al. | 428/327 |
| 4,069,186 | 1/1978 | Ramig | 260/29.6 |
| 4,081,583 | 3/1978 | Akiyama et al. | 428/457 |
| 4,115,331 | 9/1978 | Tominaga et al. | 260/17.4 |
| 4,247,438 | 1/1981 | Eck et al. | 260/29.6 |
| 4,277,385 | 7/1981 | Carroll et al. | 260/29.6 |
| 4,302,367 | 11/1981 | Cordes et al. | 260/17 |
| 4,384,069 | 5/1983 | Wendel et al. | 524/521 |
| 4,408,015 | 10/1983 | Flatau | 525/227 |
| 4,543,387 | 9/1985 | Padget et al. | 524/523 |
| 4,619,960 | 10/1986 | Dodge | 524/245 |
| 4,652,482 | 4/1987 | Diesel | 428/153 |
| 5,118,533 | 6/1992 | Saji | 427/391 |

FOREIGN PATENT DOCUMENTS

64289  6/1978  Japan .......................... 428/121

OTHER PUBLICATIONS

J. H. Briston, Dr. L. L. Katan, *Plastics Films*, Second Edition, Copyright 1983, (6 pages), pp. 78–81.

Four-page brochure published by Groovfold, Inc. of Newcomerstown, Ohio 43832 describes V-folding, including lineal grooving, wherein angle cutters are used for mitering boards covered with simulated wood vinyl.

Three-page packet of illustrations published by Groovfold, Inc., of Newcomerstown, Ohio 43832, illustrates lineal grooves and profile and cross grooves (wrap inside view).

*Primary Examiner*—Nasser Ahmad
*Attorney, Agent, or Firm*—Nields & Lemack

[57] ABSTRACT

A paper sheet is saturated with a latex saturant wherein two components have different $T_g$ values to produce an overlay which sufficiently resists the stresses of miter-folding, or V-grooving, and possesses superior printing qualities which favor its application on substrates such as miter-folded boards and particle boards, cabinetry, shelves, furniture, intricate surfaces such as profile wraps and molding strips, doors, frames, and other such structures.

9 Claims, 5 Drawing Sheets

5,413,834

MITER-FOLDABLE SATURATED PAPER-BASED OVERLAY SYSTEM AND METHOD FOR FABRICATING THE SAME

It would be desirable to use paper instead of vinyl because of the superior print quality and the manageability of paper during lamination. However, papers lack the physical strength required of machinable materials. Particularly, in miter-fold applications wherein an overlay material (vinyl) is glued to one side of a particle board which is cut on the opposite side with V-grooves and then bent at those grooves to form corners and angles, paper would have to possess strength sufficient to resist tearing and/or splitting when the miter-fold edge is formed.

Until the instant invention, the superior printing quality of paper could not be exploited in miter-fold applications because of the severe stresses encountered during the miter-folding or "V-grooving" operation. In view of the disadvantages of the prior art vinyl laminate overlays, novel paper-based overlay systems are needed.

SUMMARY OF THE INVENTION

The present invention provides a paper-based overlay system which comprises the use of a saturated paper having sufficient "miter-fold" strength, adequate smoothness for printers, and adequate adhesive anchorage capabilities for application to surface structures. A method for making the overlay system is also disclosed.

A paper sheet is saturated with a saturant comprising a latex having at least two components with different $T_g$ values to produce an overlay which sufficiently resists the stresses of miter-folding, also called "V-grooving", and possesses superior printing qualities which favor its application on substrates such as miter-folded boards and particle boards, cabinetry, shelves, furniture, intricate surfaces such as profile wraps and molding strips, doors, frames, and other such substrates which may or may not be formed by miter-cutting/folding.

In an exemplary saturated paper-based overlay, a sheet of paper is saturated with an acrylic/PVC blend and hot calendered to a high degree of smoothness. Optionally, a thickener, such as sodium alginate, is added to the saturant to reduce surface migration of the lower $T_g$ component, and a release agent, such as sorbitan tristearate, is added to prevent the material from sticking during calendering. The sheet may be colored, printed, imaged, and/or patterned, such as by rotogravure processes, and applied to one or more surfaces of a substrate.

Overlaid substrates of the invention comprise the use of the saturated paper sheet on a substrate such as a board. The board may be miter-cut on at least one surface and folded such that a continuous paper surface is presented at the miter-folded edge.

Other overlaid substrates include highly detailed surfaces such as moldings and frames which have intricate surfaces that may or may not involve miter-cutting and folding but which nevertheless impose stresses by virtue of the forces imposed on the paper by the sharp grooves, angles, or detailing in the profile wrapping.

The overlaid substrates of the invention may therefore include cabinets, shelves, drawers, enclosures, tabletops, doors, frames, molding, and the like, which have saturated paper overlay adhered to at least two non-coplanar surfaces.

A method for fabricating the overlay comprises the step of saturating a paper sheet in a saturant system comprising at least two components having different $T_g$ values. The saturated sheet is preferably stack-calendered to obtain a uniform caliper and smoothness, and optionally printed, colored, imaged, and/or patterned, either before or after application to boards or other surfaces. The method may further comprise the step of adhering the saturated paper sheet to at least one surface of a substrate which is miter-cut and folded to present a continuous paper surface along the miter-folded cut.

A method for fabricating profile wrapping or highly-detailed substrates overlaid with the saturated paper-based overlay comprises the step of providing a highly irregular surface and adhering the paper-based overlay contiguously with the surface. In an exemplary method, the paper is patterned with wood grain, and the patterned paper is applied to a substrate surface to create an appearance that the substrate or structure is comprised of solid wood.

BRIEF DESCRIPTION OF THE INVENTION

DETAILED DESCRIPTION OF THE INVENTION

Figure 1:
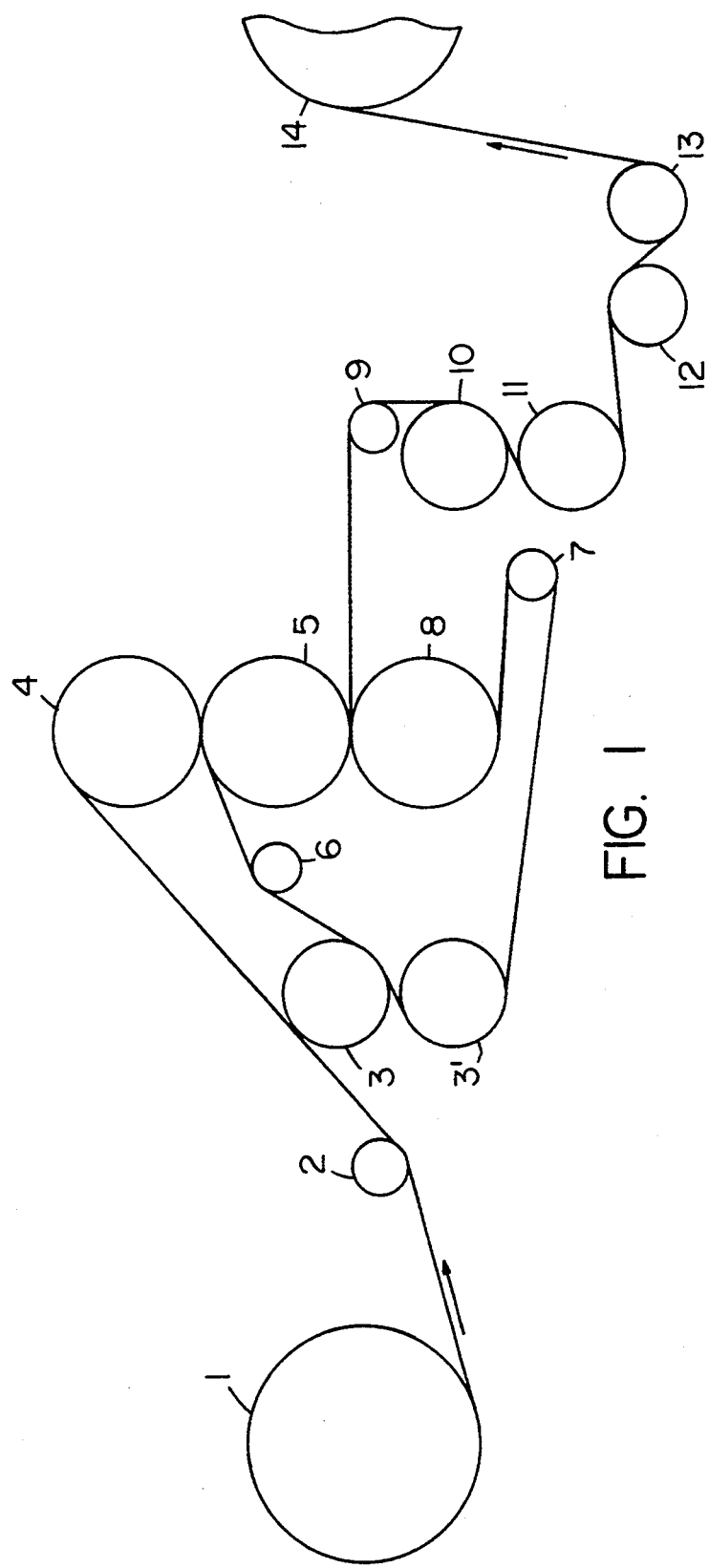
FIG. 1 is a diagrammatic view of a threading system for the stack calender used in accordance with the present invention.

The invention comprises a saturated paper-based overlay system, including overlaid substrates (or structures), and methods for fabricating the same. As used herein, the term "substrate" means and refers to structures, materials, and/or objects.

The overlay system of the invention comprises a paper sheet, preferably of heavy weight paper, that has been saturated with a latex saturant having at least two components with different glass transition ($T_g$) values. An exemplary saturant comprises a latex blend of (1) acrylic, which has a $T_g$ of about $-10$; and (2) unplasticized polyvinyl chloride (PVC), which has a $T_g$ of about $+67$. Although less preferred, ethylene vinyl acetate (EVA) can be substituted for the acrylic. EVA also has a $T_g$ of about $-10$. Styrene acrylate, vinyl acetate, or methyl methacrylate may be substituted for or added in combination with the PVC. Preferably, the $T_g$ of one of the latex components is such that at room temperature the component does not tend to form a film.

Preferably, the $T_g$ of the saturant components differ by 30. More preferably, the difference is at least 40, and most preferably it is greater than 50. For example, the acrylic/PVC blend has $T_g$ values which differ by 70. It is believed that the acrylic functions as a binder which sets around or upon the cellulosic fibers of the paper and the PVC latex particles which do not form a film but remain for the most part as individual particles; and that the PVC particles, distributed about the cellulosic matrix, are then melted, such as during calendering, and hold the system together in a denser matrix than would the acrylic acting alone.

Suitable raw paper for use in the instant invention must have good formation and good physical strength, and must be saturable. The preferred raw paper meeting these requirements is Owensboro HP-8 75# available from W. R. Grace & Co.-Conn. Such paper has a fiber composition of 85% (by weight) Northern Bleached Softwood Kraft and 15% (by weight) Hemlock Sulfite. Preferably, the paper is of a heavy weight, and the cellosic fibers which constitute the paper are random, such that the paper sheet has machine direction (MD) and cross direction (CD) strength; in other words, it is strong in many directions, although it is not necessary that it be equally strong in all directions.

The saturant system must be able to withstand the actual physical abuse delivered to the sheet during a V-grooving operation. The physical properties that relate best to this operation are, in the order of importance, edge tear and tear initiation, internal tear (tear propagation), delamination resistance, and tensile strength/elongation. In addition, the saturant system must have the ability to be calendered to a high degree of smoothness, and must maintain that smoothness. An immediate smoothness less than about 100 Sheffield units is preferred.

An acrylic system, being plastic by nature, calenders to the required smoothness. Acrylics are also lightfast, which is a further advantage of the saturant. Preferably, an acrylic latex such as HYCAR TM 26104 available from the B. F. Goodrich Chemical Company, is suitable for use in the invention. The acrylic latex can be used in an amount of from 55% to 96.75%, and preferably 55–66%, most preferably about 56.75%, on a dry basis, depending upon the processing and smoothness retention.

While inorganic fillers may be used in the saturant system, such as clay or titanium dioxide, these tend to cause failures during miter-folding. Organic fillers such as unplasticized PVC are less destructive to the cellulose fibers during miter-folding because the particles are spherical rather than platelet-shaped and are believed to be less damaging to the strength of the cellosic fibers in comparison with the inorganic fillers. A suitable PVC latex is GEON TM 352, available from B. F. Goodrich, which is used in an amount of from 0% to 40%, preferably 33–40%, and most preferably about 40%, on a dry basis. An ethylene vinyl acetate (EVA), such as Dur-O-Set TM E-646, available from the National Starch Company, may be used instead of the acrylic.

In order to increase the delamination resistance of the overlay, it is necessary to reduce the level of binder migration common during the drying of heavyweight papers. A thickener can be added to the saturant system for this purpose. Known cellulosic thickeners can be used. Sodium polyacrylate and alkali reactive emulsions can also be used. However, cellulosics impart solvent resistance to the saturant (which can interfere with printability), and brittleness. Sodium polyacrylate and the alkali reactive emulsions also exhibit these effects and can be water sensitive as well. Accordingly, the preferred thickener is sodium alginate. Kelgin TM MV, available from Kelco, Inc., may be used in an amount of from 0.15% to 0.35%, dry basis, to limit migration at various saturator line speeds.

Another functional ingredient for the saturant system is a release agent, which is believed to migrate to the surface of the sheet during the calendering operation and provide release from the hot steel rolls. Emulsified waxes or waxy materials could be used for this purpose, although emulsified waxes tend to cause smoke generation during processing. Waxy materials such as stearylated melamine can impart other properties that may or may not be undesirable, such as water resistance after processing. Preferably, the release agent is sorbitan tristearate, such as TWEEN ® 65 from ICI Americas, Inc. Sorbitan tristearate also can be used to improve smoothness. It is used in an amount of from 0% to 3% on a dry basis to provide release from the hot calender rolls at various calender line speeds.

Other inert ingredients, such as pigments and defoamers can be added. Preferably, the paper is saturated to a 40% add-on level.

An exemplary saturant system comprises the following amounts of preferred ingredients on a dry solids basis:

56.75% acrylic latex
40.00% polyvinyl chloride latex
0.25% sodium alginate
3.00% sorbitan tristearate Since the pH of acrylic latexes is generally low, and the pH of PVC latexes is generally high, it is preferred that the pH of the acrylic latex be raised with dilute ammonium hydroxide and that the PVC latex be added thereto slowly. The order of addition of the remaining ingredients is not critical.

FIG. 1 illustrates an exemplary procedure for fabricating an exemplary saturated paper-based overlay in accordance with the instant invention. The paper is unwound from roll 1, and passed by tension transducer roll 2 to heated steel calender roll 4. The paper then travels through a nip formed between roll 4 and fiber calender roll 5, past mt. hope spreader roll 6, tension rolls 3 and 3' (turned off and used as idler rolls), idler roll 7, and a second heated steel calender roll 8 and fiber calender roll 5. The sheet then passes over a steel idler roll 9, and is cooled by first and second cooling rolls 10 and 11. Adequate heat transfer between the paper web and these cooling rolls can be accomplished by cooling the rolls with ordinary tap water, which is typically at temperatures from 58° F. to 72° F., most typically 65° F. The sheet then passes over a large diameter mt. hope roll 12 and a large diameter idler roll 13, and is rewound on roll 14. The practical minimum diameter of any of the rolls is about 3 inches. The saturator squeeze rolls (not shown) and the calender steel rolls must be of a diameter and construction that will resist flexing while in operation. The minimum diameter of any of the rolls is 3 inches.

Temperature of the heated calender rolls, line speed and nip pressure are critical in order to achieve uniform caliper and smoothness of the sheet. It is preferred that the line speed be 150 feet/minute, that the nip pressure be 1100 psig, and that the temperature of the heated steel calender rolls 4 and 8 be 325° F. Significant deviations from these values may result in a product that is unstable in terms of smoothness.

EXAMPLE 1

Figure 2:
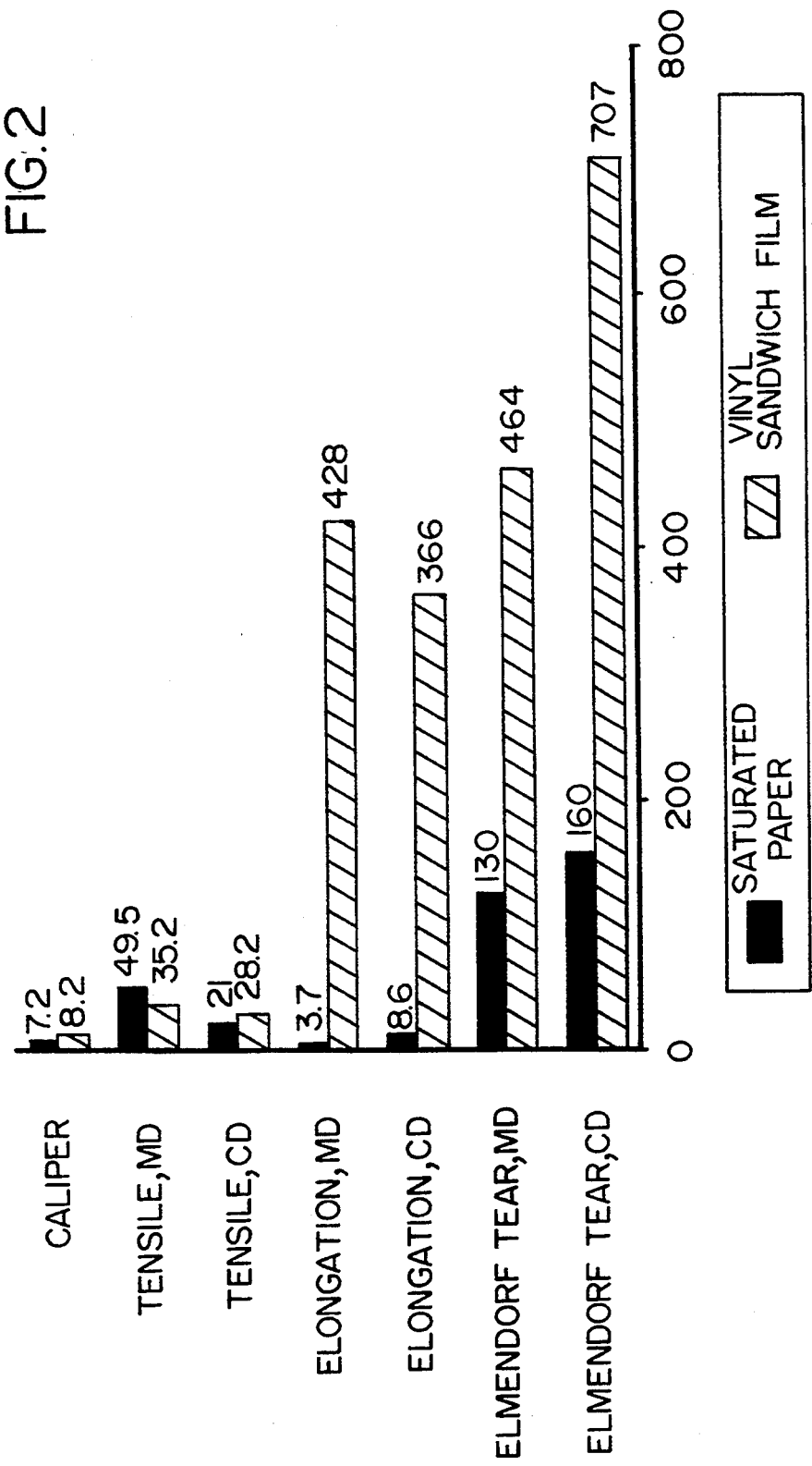
FIG. 2 is an illustrative comparison of important properties of paper and vinyl for overlay applications.

A comparison of some of the properties of paper and 8 mil vinyl sandwich film is shown in FIG. 2. The vinyl sandwich film compared therein was produced in accordance with the process outlined in PLASTIC FILMS, second edition, by John H. Briston, chapter 8, section 2, 1983, the disclosure of which is hereby incorporated by reference. In particular, the sandwich film is two films, one colored and printed, and the other clear, that are laminated together. Both of the films of this sandwich were made by the process outlined in section 8.2.

The saturated paper of FIG. 2 was made in accordance with the instant invention. The untreated paper was saturated by forcing the paper to enter a large shallow pan containing the saturant mixture. The paper was then directed through a pair of squeeze rolls. The squeezing or wringing of the paper controls the add-on level. After squeezing, the paper was dried by a combination of forced hot-air, infrared and contact heat dryers. The paper was saturated to a 40% add-on level. Once dry, the paper was rerolled and subjected to the calendering process in accordance with the instant invention.

FIG. 2 shows the significant advantages of using paper instead of vinyl in terms of percent elongation and Elmendorf tear (grams), without sacrificing tensile strength (lbs/inch of width). The saturated paper does not stretch much in terms of percentage elongation, and therefore retains better printing registration. However, the tear properties for the paper are still high enough for adequate performance in miterfold applications. Preferably the saturated paper used in accordance with the instant invention has a caliper of 6-8 mils and a Sheffield smoothness of about 85.

In further exemplary paper-based overlays of the invention, the saturated paper sheet is preferably printed, colored, patterned, and/or imaged. The paper overlays are compatible with nitrocellulose based inks and paints, polyurethane based inks and paints, and even vinylic inks and paints. The papers may be imaged or patterned using any known process, such as by rotogravure processes which are often used by furniture manufacturers to impart a woodgrain look. The papers may also be colored with known inks or paints. In other exemplary overlays, a protective coating may be applied prior to or after installation of the paper to a substrate surface. Most preferred are polyurethane coatings and varnishes.

Exemplary saturated paper-based overlay systems of the invention comprise (1) a paper sheet saturated with at least two latex components having different $T_g$ values and hot-calendered; and (2) a structure having at least one surface upon which said saturated paper sheet is adhered. Accordingly, the system comprises a sheet of paper saturated in a latex saturant comprising at least two latex components, the first of said latex components including acrylic or ethylene vinyl acetate, and the second of said latex components including polyvinyl chloride, styrene acrylate, vinyl acetate, or methyl methacrylate, said sheet being calendered after saturation; and a substrate having a surface for disposition thereupon of said saturated paper sheet, whereby said paper sheet covers at least a portion of said substrate. The substrate may further comprise joined non-planar surfaces, such as a miter-folded corner, across which the saturated paper is adhered as a continuous, coherent sheet.

Figure 3:
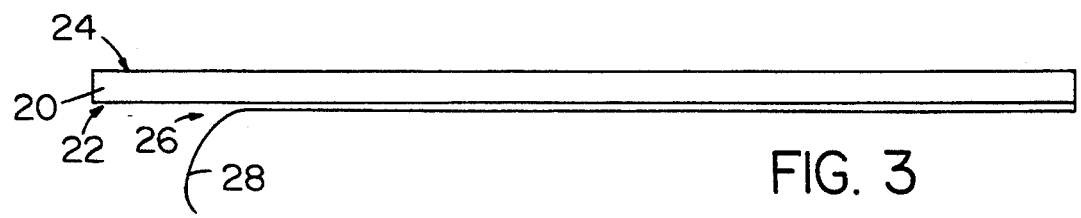
FIG. 3 is a plan side-view of a saturated paper-based overlay of the invention applied to a substrate such as a board or structure.
Figure 4:
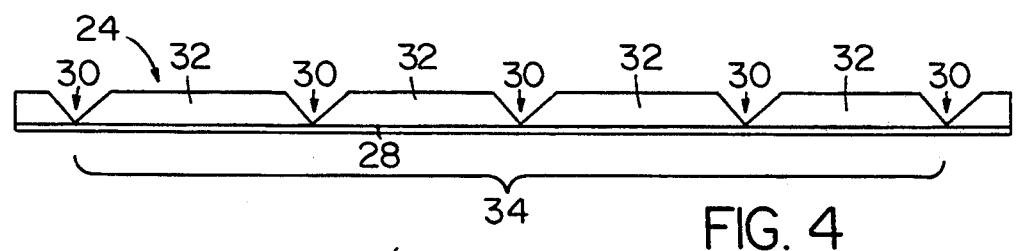
FIG. 4 is a plan side view of the overlay-covered substrate of FIG. 3 wherein the other surface of the substrate has been miter-cut.
Figure 5:
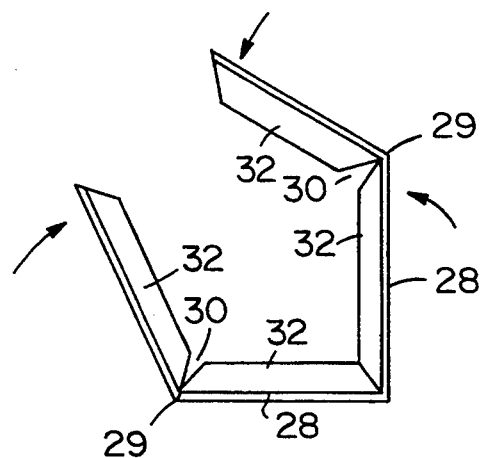
FIG. 5 is a plan side view of the miter-cut board of FIG. 4 folded along miter cuts.
Figure 6:
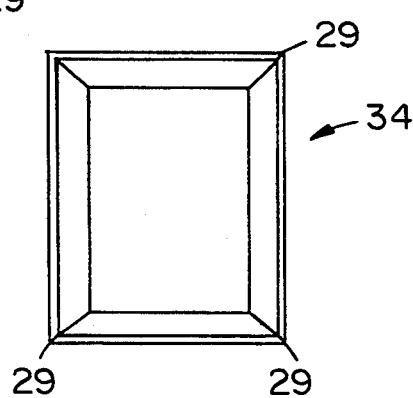
FIG. 6 is a plan view of an enclosure formed by folding together the miter-cut sections of the board shown in FIG. 5.

FIGS. 3-6 illustrate a method for fabricating an exemplary saturated paper-based overlay system wherein the saturated paper sheet 28 is adhered onto a first side or surface 22 of a substrate such as a board 20 or other surface structure. The adhesive 26 may be first applied to the board 20 surface 22 or to the paper sheet 28 (FIG. 3). Miter cuts 30 are made on the second or opposite side 24 of the board 20 to form separate sections 30 (FIG. 4) which are then folded or joined at the miter cuts 30 (See FIG. 5) to form the desired object 34 such as a box 34. Cabinets, drawers, frames, tabletops, doors, enclosures, speaker enclosures, and other objects may be fabricated using the saturated paper 28, which withstands the stresses of miter-cutting 30 and folding (FIG. 5) so as to present a continuous sheet of paper at miter-folded edges 29.

Known adhesives 26 may be used, such as urea formaldehyde, polyvinyl acetate, ethylene vinyl acetate (EVA), or epoxies. The use of EVAs are preferred.

Figure 7:
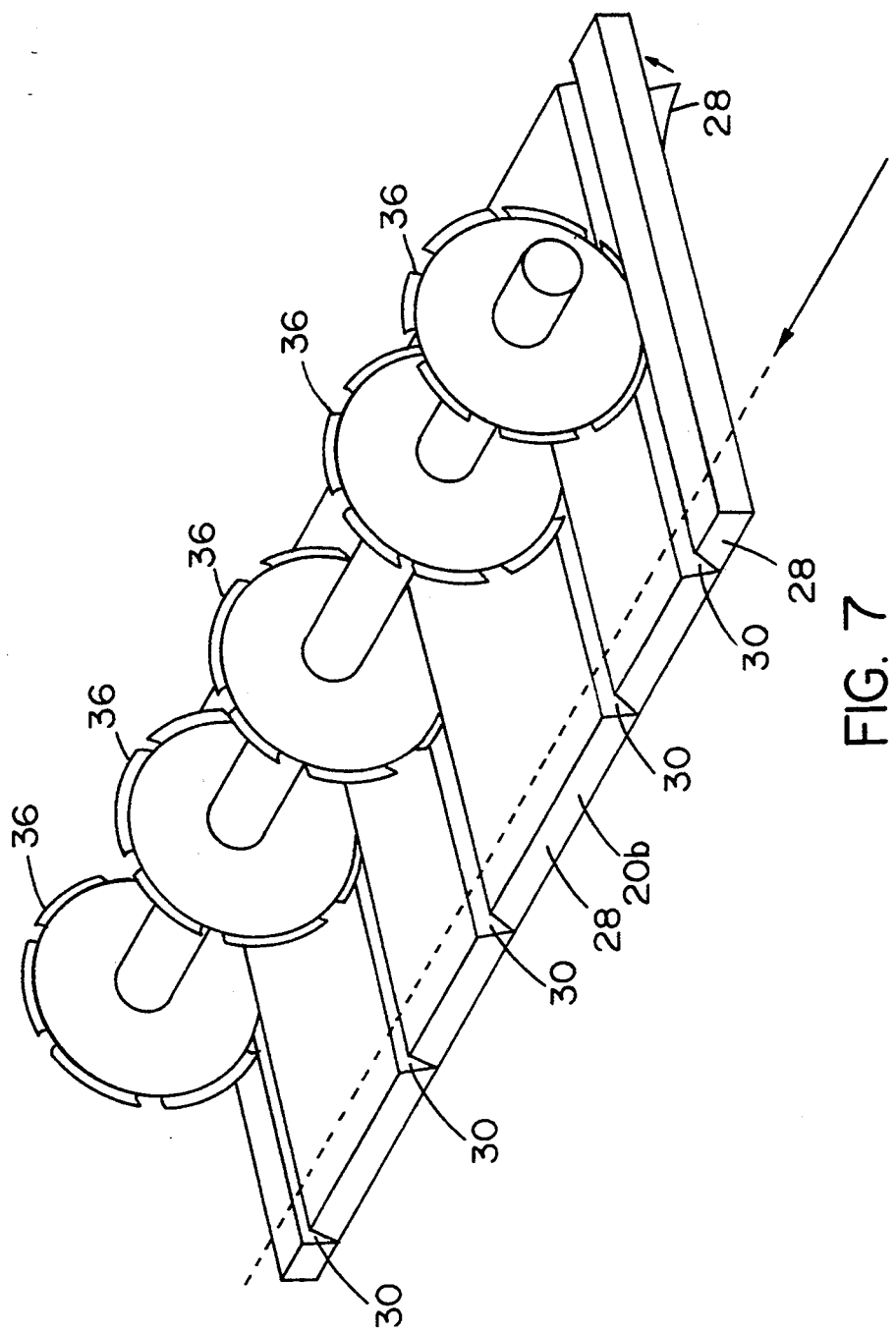
FIG. 7 is a perspective illustration of ganged saws for simultaneous miter cutting.

FIG. 7 illustrates the use of ganged saws 36 for simultaneously miter-cutting a number of grooves 30 at once in a substrate such as a particle board 20. The board has a saturated paper-based overlay 28 adhered on a major face. The paper overlay 28 may also be adhered on minor faces 20b to provide a continuous appearance when the major and minor faces are simultaneously viewed. The arrow 35 indicates a direction across the mitercuts 30 for cutting a channel or groove (dotted line) for containing a face plate or other surface between the sides 20b when folded together.

Figure 8:
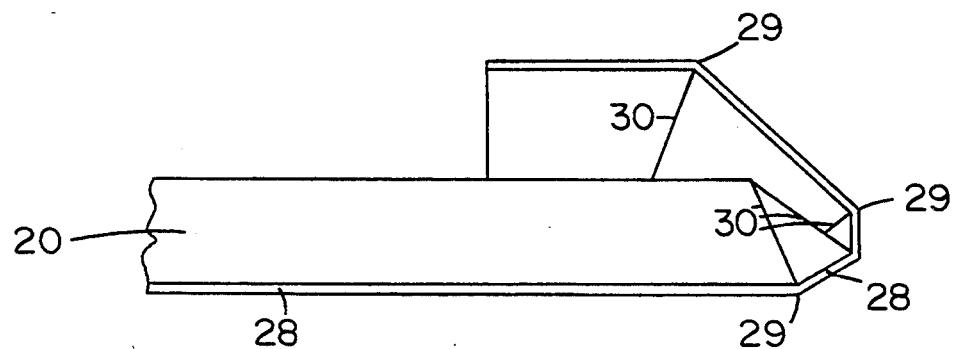
FIG. 8 is a side illustrative view of an exemplary overlay system comprising a substrate having a paper-based overlay.

As shown in FIG. 8, the saturated paper 28 may be applied to a board 20, such as a particle, laminate, or composite board, which has been miter-cut 30 at more than one point on the board 28. The various miter cuts 30 may be variously angled and spaced from each other such that an infinite variety of overlaid structures can be fabricated. Accordingly, the saturated paper-based overlay system of the invention is sufficiently strong that the paper may be applied to a structure which is subjected to numerous miter folds 30 which impose a large cumulative stress to the coherent paper overlay 28, which nevertheless provides a continuous surface 29 at the folds 30.

The saturated paper-based system of the invention may also include a substrate that is a decorative molding or strip, as shown in the cross-sectional view at 35, which may or may not be miter-cut but which presents irregularities and at least two surfaces which are not co-planar. Such intricate surfaces may seriously challenge the successful application of decorative laminates.

Figure 9:
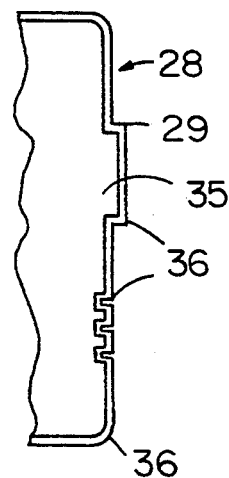
FIG. 9 is a side cross-sectional view of a substrate, such as a decorative molding strip, which has a detailed surface upon which a saturated paper-based overlay is adhered.

Accordingly, an exemplary overlay system comprises such a structure 35 as shown in FIG. 9 which has a high degree of detailing, ie. various sharp edges, projections, indentations, angles, and curves as indicated generally at 36. The overlay 28 may be optionally colored, printed, and/or patterned.

As modifications may be evident to those skilled in the art, the foregoing embodiments are illustrative only, and the scope of the invention is limited only by the claims.

What is claimed is:
1. An overlay system comprising:

a wood substrate having a first side and a second side opposite said first side, said second substrate side having a miter cut operative to permit said substrate to be folded at said miter cut such that said first substrate side is miter-folded so as to present an edge between two non-coplanar surfaces;

a saturated paper sheet having a first side coextensive with and adhesively contacting said miter-folded first substrate side, and having a second side opposite said adhered first saturated paper sheet side, said adhered saturated paper sheet directly adhered to said wood substrate prior to miter-cutting so as to permit formation of a miter-folded edge, and thereby being adhered upon miter-folding to said edge between said non-coplanar surfaces of said first side of said miter-folded saturated paper sheet substrate, said saturated paper sheet substrate being saturated prior to adhesion thereof to said first substrate side using a latex saturant comprised of a blend of two components, a first component selected from the group consisting of an acrylic and an ethylene vinyl acetate, and a second component selected from the group consisting of polyvinyl chloride, styrene acrylate, vinyl acetate, and methyl methacrylate, said first and second components having $T_g$ values which differ by at least 30, and said saturant further comprising a thickener and a release agent, said saturated paper sheet being further hot calendered to a Sheffield smoothness of less than 100 prior to adhering said sheet to said wood substrate, and said second side of said saturated paper sheet substrate thereby presenting a continuous paper surface across said miter-folded edge.

2. The overlay system of claim 1 wherein said wood substrate comprises a particle board.

3. The overlay system of claim 2 wherein said saturated paper sheet is printed prior to adhesion thereof to said first substrate side.

4. The overlay system of claim 3 wherein said paper sheet further comprises a wood grain pattern.

5. The overlay system of claim 3 further comprising a protective coating layer over said paper sheet.

6. The overlay system of claim 5 wherein said protective coating layer comprises polyurethane or varnish.

7. The overlay system of claim 1 wherein said latex components comprise an acrylic and polyvinyl chloride.

8. The overlay system of claim 1 wherein said two latex components have a difference of $T_g$ values of at least 50.

9. The overlay system of claim 3 wherein said paper sheet is printed whereby it is colored.

* * * * *